(12) United States Patent
Kraus et al.

(10) Patent No.: US 6,702,102 B2
(45) Date of Patent: Mar. 9, 2004

(54) EXCITER MASS ASSEMBLY FOR A VIBRATORY DEVICE

(75) Inventors: Richard B. Kraus, Barrington, IL (US); Edward Steffes, Jr., Woodstock, IL (US); David A. Dawson, Mundelein, IL (US)

(73) Assignee: General Kinematics Corporation, Barrington, IL (US)

( * ) Notice: Subject to any disclaimer, the term of this patent is extended or adjusted under 35 U.S.C. 154(b) by 0 days.

(21) Appl. No.: 10/294,133

(22) Filed: Nov. 14, 2002

(65) Prior Publication Data

US 2003/0098220 A1 May 29, 2003

Related U.S. Application Data

(60) Provisional application No. 60/335,921, filed on Nov. 15, 2001.

(51) Int. Cl.[7] .............................................. B65G 27/06
(52) U.S. Cl. ........................ 198/758; 198/759; 198/771
(58) Field of Search .............................. 198/758, 759, 198/760, 771, 766

(56) References Cited

U.S. PATENT DOCUMENTS

| | | | |
|---|---|---|---|
| 2,588,030 A | * | 3/1952 | Musschoot et al. ...... 198/758 X |
| 3,089,582 A | | 5/1963 | Musschoot et al. |
| 3,358,815 A | | 12/1967 | Musschoot et al. |
| 3,677,395 A | | 7/1972 | Musschoot |
| 3,743,080 A | * | 7/1973 | Musschoot .................. 198/759 |
| 4,017,060 A | | 4/1977 | Brander et al. |
| 4,471,891 A | | 9/1984 | Musschoot |
| 4,495,826 A | | 1/1985 | Musschoot |
| 4,617,832 A | | 10/1986 | Musschoot |
| 4,754,870 A | | 7/1988 | Hallman |
| 4,844,236 A | * | 7/1989 | Kraus ..................... 198/771 X |
| 5,054,606 A | | 10/1991 | Musschoot |
| 5,178,259 A | | 1/1993 | Musschoot |
| 5,657,902 A | | 8/1997 | Kraus |
| 6,029,796 A | | 2/2000 | Musschoot |
| 6,112,883 A | * | 9/2000 | Kraus et al. ............. 198/759 X |
| 6,155,428 A | | 12/2000 | Bailey et al. |

FOREIGN PATENT DOCUMENTS

FR 1.300.354 6/1962

OTHER PUBLICATIONS

Copy of International Search Report for International Application No. PCT/US02/36948, dated Mar. 19, 2003, 5 pages.

* cited by examiner

Primary Examiner—James R. Bidwell
(74) Attorney, Agent, or Firm—Marshall, Gerstein & Borun LLP

(57) ABSTRACT

An exciter mass assembly for vibratory processing equipment includes an exciter frame and at least one resilient member connecting the exciter frame to the vibratory processing equipment. A motor is supported by the exciter frame so that the exciter frame and motor define a frame center of gravity. The motor includes a rotating shaft defining a shaft center of gravity. The prime mover is positioned with respect to the exciter frame such that the shaft center of gravity is substantially coincident with the exciter mass center of gravity, thereby to minimize movement of the exciter mass assembly in unintended directions.

15 Claims, 3 Drawing Sheets

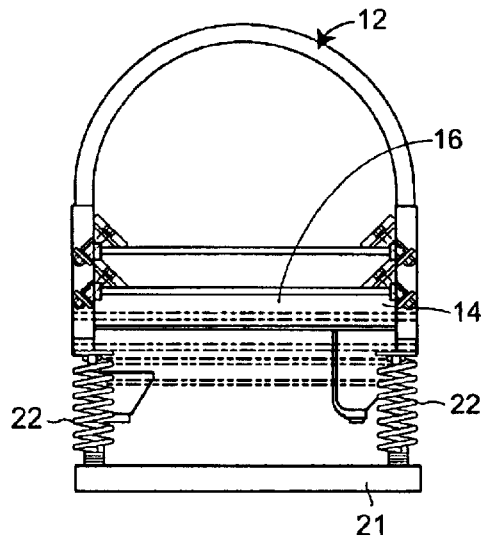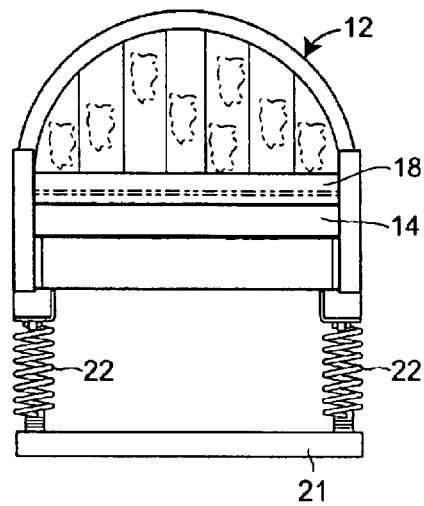
FIG. 2  FIG. 3
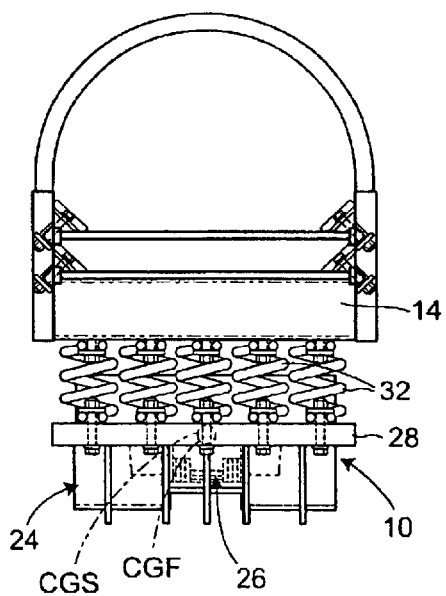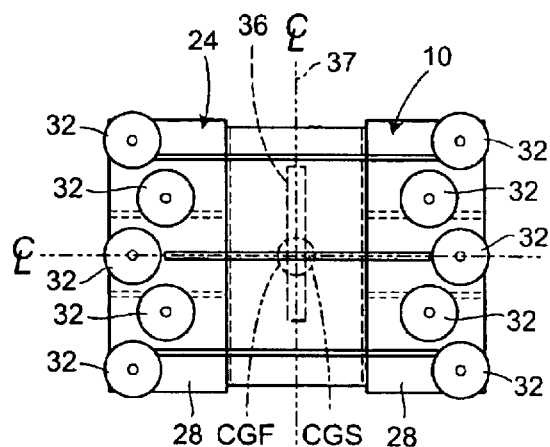
FIG. 4  FIG. 5

EXCITER MASS ASSEMBLY FOR A VIBRATORY DEVICE

CROSS-REFERENCE TO RELATED APPLICATION

This application claims the benefit under 35 U.S.C. §119(e) of U.S. provisional patent application Ser. No. 60/335,921 filed Nov. 15, 2001, the disclosure of which is incorporated herein by reference.

FIELD OF THE INVENTION

The present invention generally relates to vibratory devices and, more particularly, to exciter mass assemblies used to generate vibrational movement in such devices.

BACKGROUND OF THE INVENTION

Industrial vibratory devices, such as conveyors, feeders, and other vibrating process equipment, are generally known in the art for transporting, feeding, or otherwise processing a product. Such devices typically include a work member, such as a trough, on which rests the product to be processed. An exciter mass is resiliently connected to the trough, such as by springs. A prime mover, such as a motor having rotating shaft carrying unbalanced weights, is attached to the exciter mass. When the motor shaft rotates, the unbalanced weights create a vibratory oscillation in the exciter mass that is transferred to the trough via the springs. The vibration of the trough is, consequently, imparted to the product.

The connection between the exciter mass and the trough may be arranged to create a desired responsive movement in the product. For example, if the trough is sloped with respect to horizontal, the exciter mass may be positioned to create an entirely vertical vibration, which will allow gravity to advance the product along the trough. If the trough is horizontal, the exciter mass may be positioned to create a vibration having horizontal and vertical components to advance the product along the trough.

The resilient members used to connect the exciter to the trough are movable in a variety of motions. Springs, for example, may extend and contract in an axial direction, twist in a torsional direction, and translate in a shear direction. A given spring has a natural resonant frequency for each direction of movement. For example, rotation of the motor at the torsional spring frequency tends to move the exciter in the torsional direction. Similarly, rotation of the motor shaft at the shear and axial spring frequency tend to move the exciter in the shear and axial directions, respectively. It is desirable, however, to move the exciter in a single direction, such as in the axial direction.

Conventional vibration devices often require additional components, such as stabilizing legs, to restrict movement in the non-desired directions. In conventional vibration devices, the exciter mass is in the form of a metal slab or frame, and the motor is simply mounted to the slab or frame in a generally cantilever fashion. Consequently, as the motor shaft is rotated at different speeds, it may reach each of the spring frequencies, causing movement of the exciter mass in each of the spring directions. The use of stabilizing legs effectively raises the spring frequency in the undesired spring direction above normal motor shaft speeds, thereby minimizing or eliminating movement in the undesired spring direction. Unfortunately, the stabilizing legs add to the cost and complexity of the vibratory device.

BRIEF DESCRIPTION OF THE DRAWINGS

FIG. 2 is a left end elevation view of the feeder of FIG. 1;

FIG. 3 is right end elevation view of the feeder of FIG. 1;

FIG. 4 is cross-sectional view of the feeder taken along line A—A of FIG. 1;

FIG. 5 is a plan view of the exciter; and

DETAILED DESCRIPTION

Figure 1:
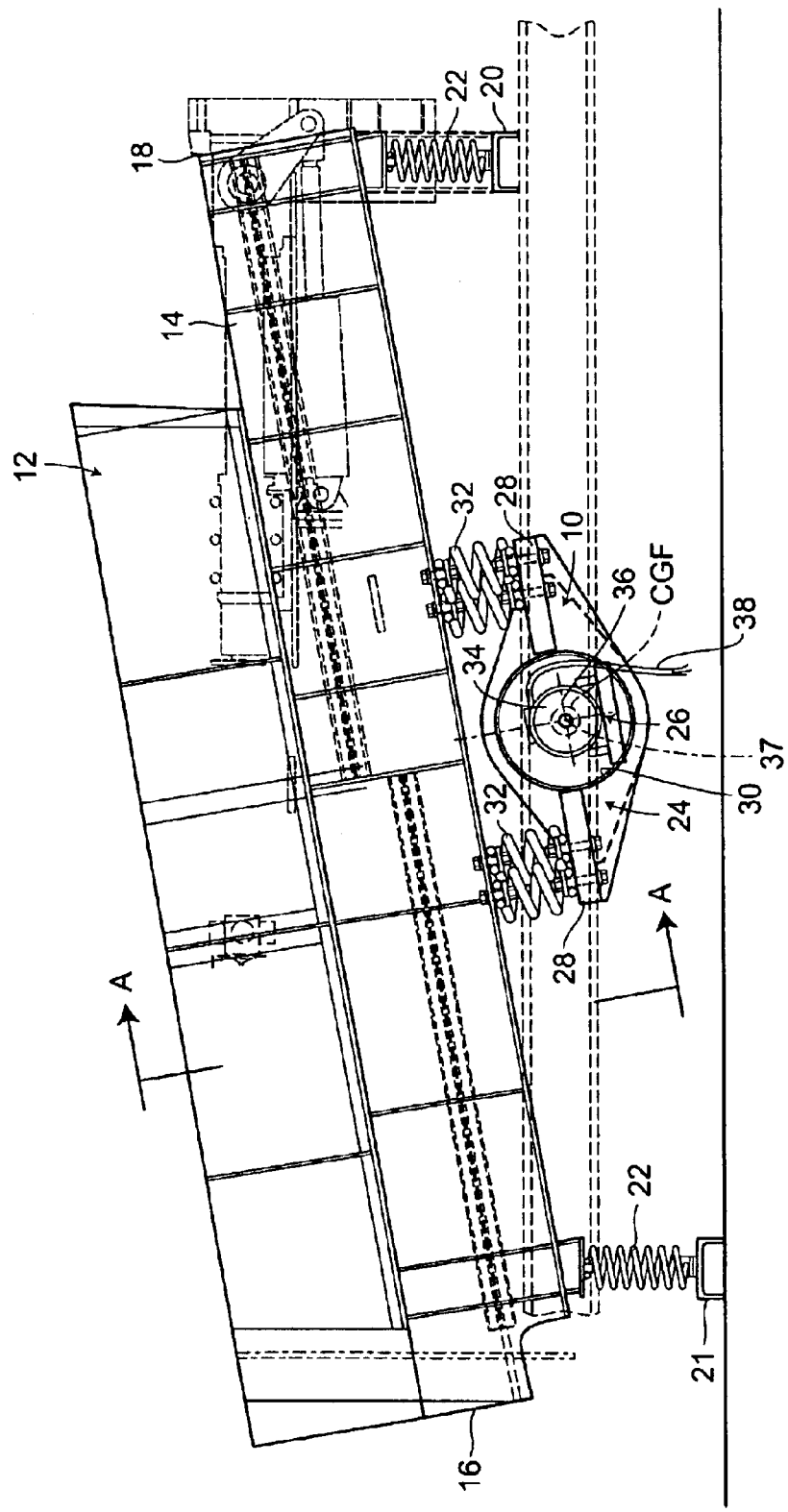
FIG. 1 is a side elevation view of a feeder having an exciter constructed in accordance with the teachings of the present invention.

Referring to FIG. 1, an example of an exciter mass assembly 10 constructed in accordance with the teachings of the present invention is shown attached to a feeder 12. The feeder 12 includes a trough 14 onto which product is placed. The trough 14 has an outlet end 16 and an inlet end 18, as best shown in FIGS. 2 and 3, respectively. The trough 14 may be supported above ground by channels 20, 21, and isolation springs 22 may be provided between the support channels 20, 21 and the trough 14. The trough 14 may be sloped so that the inlet end 18 is higher than the outlet end 16, as shown in FIG. 1. While the exciter mass assembly 10 is shown and described herein for use with a trough 14, it may be used with any type of work member requiring a vibratory action, without departing from the scope of the present invention. Furthermore, while the disclosed embodiments are shown as two-mass systems, it will be appreciated that the exciter mass assembly 10 may be provided in single mass systems.

The exciter mass 10 includes an exciter frame 24 and a prime mover 26. The exciter frame 24 includes two flanges 28 and a central bore 30 sized to receive the prime mover 26. Resilient members, such as exciter springs 32, couple the trough 14 to the exciter frame flanges 28. The size and number of springs 32 may be selected according to the application. In the exemplar embodiment, ten springs 32 are provided, with five springs 32 being located on each longitudinal side of the prime mover 26, as best shown in FIG. 5. The exciter frame 24 is shaped to have a center of gravity CGF located within the central bore 30. In the embodiment of FIG. 1, the springs 32 are aligned substantially perpendicular to the trough 14 so that vibratory motion provided by the exciter mass 10 is substantially in a vertical direction. The sloped trough 14 therefore allows gravity to advance the product along the trough 14 as it is vibrated.

The exciter frame 24 and prime mover 26 have a combined mass and define a frame center of gravity CGF. In the illustrated embodiment, the exciter frame 24 is shaped so that the center of gravity CGF is located within the central bore 30.

The prime mover 26 may comprise a motor 34 having a shaft 36. The motor shaft 36 may be double-ended, and two eccentric weights (not shown) may be mounted on each end of the shaft 36 to generate a vibratory motion when the shaft 36 rotates, as is generally known in the art. The shaft 36 and eccentric weights define a shaft center of gravity CGS. The rotating shaft 36 generates a force of rotation that is applied at the shaft center of gravity CGS. A wire 38 is provided for sufficiently energizing the motor 34 to rotate the eccentric weights. The eccentric weights may be adjustable in an angular direction to vary the exciter force, thereby to obtain the desired stroke of the trough 14 at the set natural frequency. While the exemplary prime mover 26 is described herein as a rotating motor shaft, it will be appreciated that other sources of vibratory excitation may be used, such as rotating unbalanced shafts powered by electric motor, hydraulic motor, or other similar means, without departing from the scope of the present invention.

The motor 36 is positioned inside the central bore 30 such that a center of gravity CGS of the shaft 36 is substantially coincident with the frame center of gravity CGF. As best understood with reference to FIGS. 1 and 5, the frame center of gravity CGF may lie substantially along an axis 37 of the center bore 30. The motor 34 is supported in the center bore 30 such that the shaft 36 also lies along the center bore axis 37, thereby locating the shaft 36 with respect to the frame center of gravity CGF in vertical and longitudinal directions. Furthermore, as best seen in FIG. 4, the motor is positioned laterally (that is, the left-right direction of FIG. 4) so that the shaft center of gravity CGS is substantially coincident with the frame center of gravity CGF.

With the above arrangement, movement of the exciter mass 10 in undesired spring directions is minimized without the use of stabilizing members. The springs 32 may be selected such that the spring frequency in the desired direction is sufficiently different from the spring frequencies in the undesired directions. By positioning the motor shaft 36 and frame 24 such that their respective centers of gravity are substantially coincident, any moments between the shaft 36 and frame 24 are minimized. As a result, rotation of the shaft 36 at the desired operating frequency will minimize movement in the undesired directions without the use of additional stabilizing components.

Figure 6:
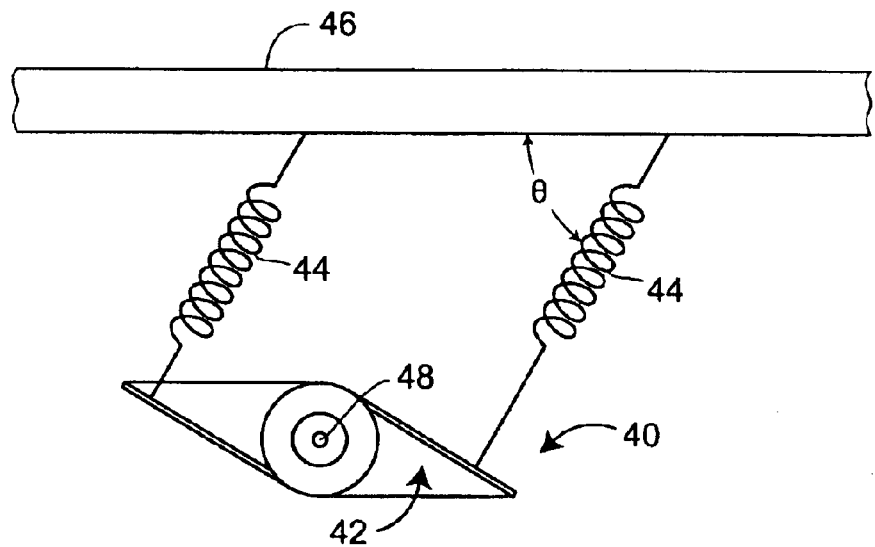
FIG. 6 is a schematic illustration of an alternative embodiment of an exciter in accordance with the teachings of the present invention.

FIG. 6 schematically illustrates an alternative exciter mass assembly 40 embodiment in which a frame 42 and springs 44 are mounted at an oblique angle 'θ' with respect to a trough 46. Unlike in the previous embodiment, the trough 46 is substantially horizontal. As a result, the springs 44 are angled to provide a vibratory motion having both vertical and horizontal components in order to advance the product along the trough 46. As in the previous embodiment, an exciter in the form of a motor shaft 48 having eccentric weights is provided, and the shaft 48 is positioned with respect to the frame 42 so that their respective centers of gravity are substantially coincident.

The foregoing detailed description has been given for clearness of understanding only, and no unnecessary limitations should be understood therefrom, as modifications will be obvious to those skilled in the art.

What is claimed is:

1. An exciter mass assembly for vibratory processing equipment, the assembly comprising:
   an exciter frame;
   at least one resilient member connecting the exciter frame to the vibratory processing equipment; and
   a prime mover supported by the exciter frame so that the exciter frame and prime mover define a frame center of gravity, the prime mover including a rotating shaft defining a shaft center of gravity;
   wherein the prime mover is positioned with respect to the exciter frame such that the shaft center of gravity is substantially coincident with the exciter mass center of gravity.

2. The assembly of claim 1, in which the exciter frame defines a central bore, and in which the prime mover is positioned inside the central bore.

3. The assembly of claim 1, in which the exciter frame includes a flange, wherein the at least one resilient member is attached to the flange.

4. The assembly of claim 3, in which the vibratory processing equipment includes a trough, and in which the flange is parallel to the trough.

5. The assembly of claim 3, in which the vibratory processing equipment includes a trough, and in which the flange is oriented at an angle to the trough.

6. The assembly of claim 1, in which the at least one resilient member comprises at least one spring.

7. An exciter mass assembly for vibratory processing equipment having a trough, the assembly comprising:
   an exciter frame having a pair of flanges positioned at opposite ends thereof;
   at least one resilient member connecting each exciter frame flange to the vibratory processing equipment; and
   a motor supported by the exciter frame so that the exciter frame and motor define a frame center of gravity, the motor including a rotating shaft defining a shaft center of gravity;
   wherein the motor is positioned with respect to the exciter frame such that the shaft center of gravity is substantially coincident with the exciter mass center of gravity.

8. The assembly of claim 7, in which the exciter frame defines a central bore, and in which the motor is positioned inside the central bore.

9. The assembly of claim 7, in which the exciter frame flanges are parallel to the trough.

10. The assembly of claim 7, in which the exciter frame flanges are oriented at an angle to the trough.

11. The assembly of claim 7, in which the resilient members comprise springs.

12. An exciter mass assembly for vibratory processing equipment having a trough, the assembly comprising:
    an exciter frame having a pair of flanges positioned at opposite ends thereof, the exciter frame defining a central bore extending therethrough;
    at least one resilient member connecting each exciter frame flange to the vibratory processing equipment; and
    a motor supported by the exciter frame so that the exciter frame and motor define a frame center of gravity, the motor including a rotating shaft defining a shaft center of gravity;
    wherein the motor is positioned inside the exciter frame central bore such that the shaft center of gravity is substantially coincident with the exciter mass center of gravity.

13. The assembly of claim 12, in which the exciter frame flanges are parallel to the trough.

14. The assembly of claim 12, in which the exciter frame flanges are oriented at an angle to the trough.

15. The assembly of claim 12, in which the resilient members comprise springs.

* * * * *